Nov. 2, 1948. S. S. BRODIE 2,452,544
INDEXING DEVICE
Filed March 30, 1944 2 Sheets-Sheet 1
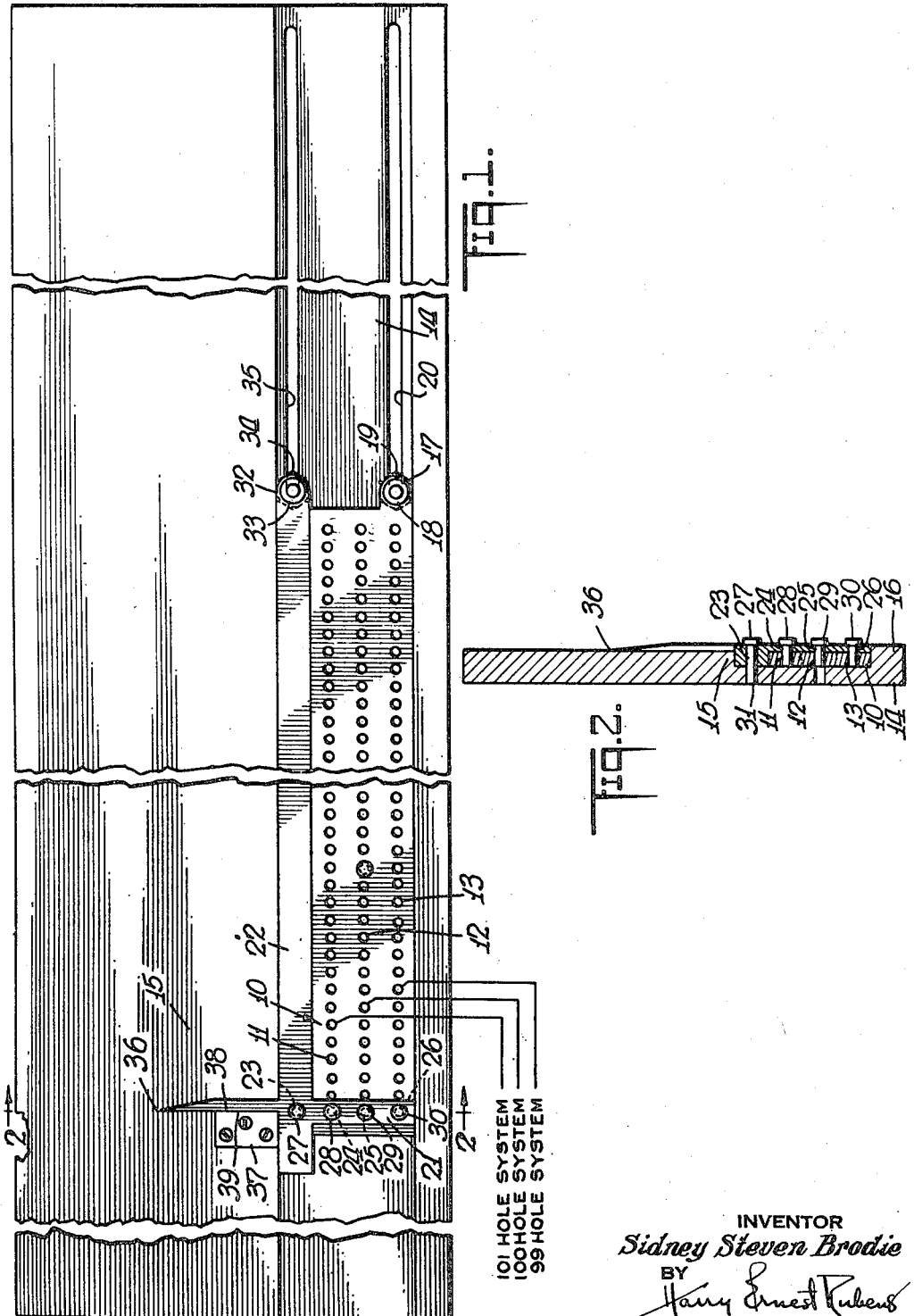
INVENTOR
Sidney Steven Brodie
BY
Harry Ernest Rubens
ATTORNEY

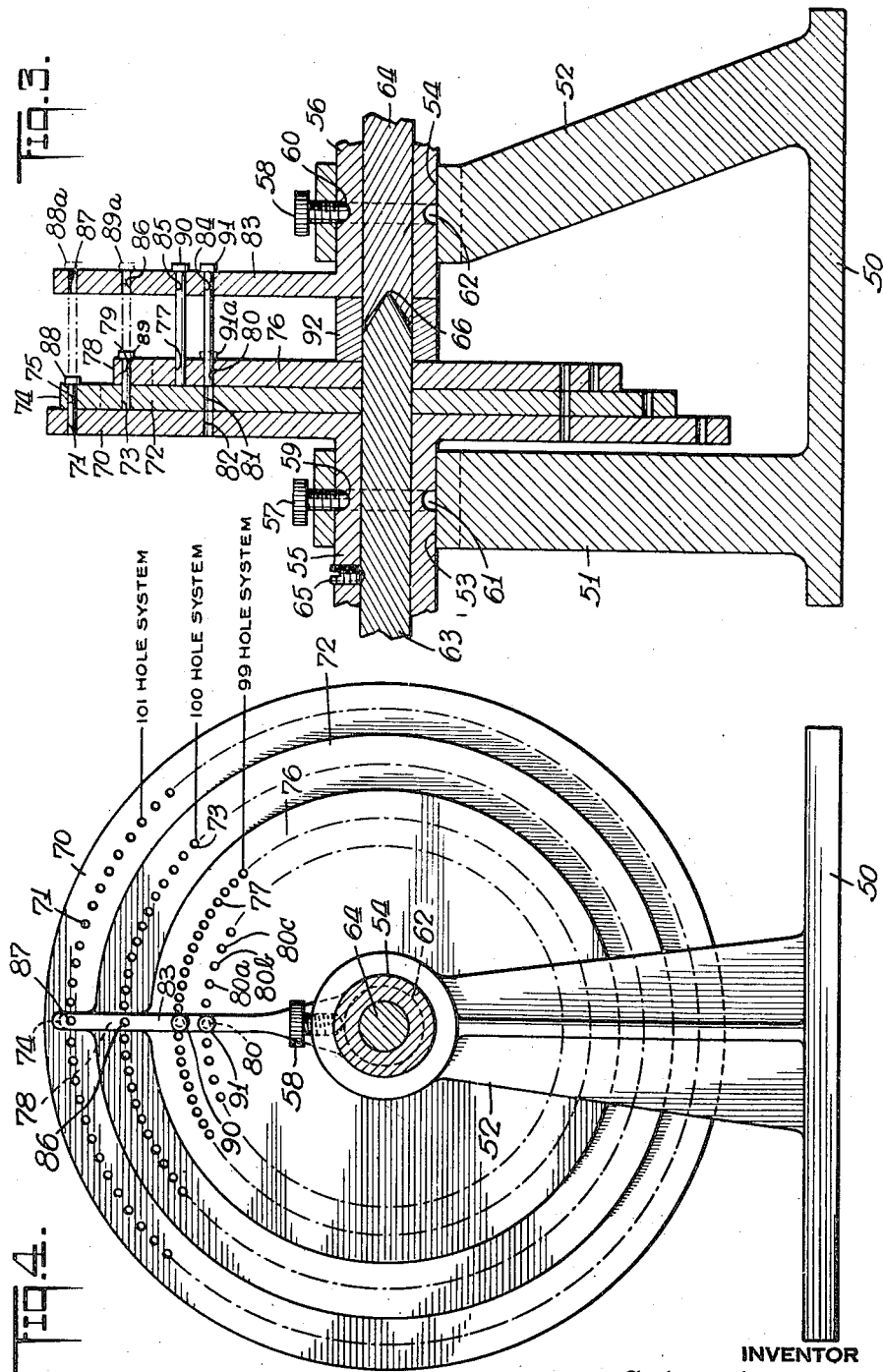

Patented Nov. 2, 1948

2,452,544

UNITED STATES PATENT OFFICE 2,452,544

INDEXING DEVICE

Sidney Steven Brodie, New York, N. Y.

Application March 30, 1944, Serial No. 528,800

6 Claims. (Cl. 33—1)

My invention relates to an indexing device for locating linear or angular divisions with unusual accuracy. By the use of a plurality of linear or concentric series of equally spaced holes or other indicia, numbering, for example, 101, 100, and 99 respectively, and the largest series approximately ten inches long or six inches in diameter, it is possible to locate accurately 3,999,600 positions on a linear scale or on a circle subject to the accuracy with which the individual indicia positioned.

Accordingly the primary purpose of my invention is to provide an indexing device employing simple mechanical means for positively locating any point or series of points with an accuracy hitherto unobtainable by simple means.

Further objects are: to provide an accurate indexing mechanism that does not require plate or gear changes to obtain any desired position; to provide an indexing mechanism that is capable of dividing a linear distance or a circle into any number of consecutive unequal parts, such as logarithmic divisions or any number of consecutive equal parts such as gear teeth; that does not require vernier readings; that is capable of repeating an initial determination for successive operations; and to provide an indexing plate having a plurality of indicia thereon for locating two predetermined points, the distance between two such points constituting an exact division of a line or angular distance of a circle.

I accomplish these and other objects and obtain my new results as will be apparent from the device described in the following specification, particularly pointed out in the claims, and illustrated in the accompanying drawing, in which:

Fig. 1 is a plan view of the linear dividing device.

Fig. 2 is a cross sectional view through 2—2 of Fig. 1.

Fig. 3 is a longitudinal cross section of the device used for angular dividing.

Fig. 4 is a front view of the same.

Linear dividing

In the drawing, Fig. 1 in particular, reference numeral 10 designates a rectangular index plate having a series of 101 holes linearly aligned and indicated as 11, a parallel series of 100 holes 12, and a third series of 99 holes 13, not including the starting or zero hole. The plate 10 is slidably mounted on a base member 14 having laterally extending wall sections 15 and 16 for containing the plate 10.

Plate 10 contains an aperture ear section 17 at one end thereof, provided with a thumb screw 18 and nut 19, which ride in a slot 20 in base member 14. By tightening the thumb screw 18, the index plate may be locked into any desired position on the base member within the longitudinal confines of the slot 20.

Indicator arm 21 extends transversely across the index plate 10 and is integral with the arm plate 22. Arm 21 contains a series of four holes 23, 24, 25, and 26 provided with pins 27, 28, 29, and 30, and which lock arm 21 to a reference hole 31 in base member 14 through hole 23, and to the starting hole of each of the three index series, through 24, 25, and 26 respectively.

At the end of arm plate 22, an aperture ear 32 is provided, similar to ear 17 of plate 10, with thumb screw 33 and nut 34, operating in a slot 35 of base member 14. Tightening the thumb screw 33 will lock the arm plate into fixed position with respect to the base member.

The indicator arm may be provided with a pointer 36 which may be used to indicate the net movement, or a block 37 may be locked into position on the top of wall section 15 with one side 38 thereof perfectly trued with the side 39 of pointer 36 so that a movement of the arm is a measure of the distance between the two sides 38 and 39.

If it is assumed that the length of each indexing system is ten inches from center to center of the first or zero hole, to the last or the 101st hole, and it is desired to move the pointer 36, or work if mounted on the arm plate 22, a distance of 1.39628 inches, the required movement on the 101-hole system is sixteen holes to the right, fourteen holes to the left on the 100-hole system, and twelve holes to the right on the 99-hole system exclusive of the zero holes. The plate movement to accomplish the foregoing is performed as follows:

The arm plate 22 and index plate 10 are locked to the base member 14 by means of thumb screws 33 and 18, with one of the pins, say 28 in the arm 21, positioned in the zero hole of the 101-hole system and with the face 38 of the starting block flush against face 39 of the pointer 36. Thumb screw 33 is then loosened, pin 28 removed, and the indicator arm 21 and attached plate 22 are moved to the right until pin 28 can be dropped into the hole 24 of the arm and center itself in a hole sixteen holes away from the starting point or zero hole on the 101-hole system. The arm plate 22 is then relocked in the position and index plate 10 is loosened, pin 28 removed, and the plate 10 moved until the fourteenth hole in the 100-hole system is located by the pin 29 inserted into hole 25 of the now stationary arm 21. The index plate is then locked, arm plate 22 loosened, and moved a net distance of twelve holes to the right from the zero hole on the 99-hole system, whereupon pin 30 is inserted into the hole 26 of the arm 21, and into the twelfth hole of the 99-hole system.

The final result is a net movement of the indicator arm of the difference between the right and left motions on the three indexing systems, or a computed equivalent of 1.39628 inches which was the objective measurement. Any other desired movement of the indicator arm from its starting point will thus result in a computed measurement within the range of the indexing systems.

An indexing plate may be used with the distance between any two selected holes equal to a net movement of the three indexing systems. It is also possible to produce a movement between each two adjacent holes on the plate, a distance equal to a fractional part of the plate length. As an example, the distance between the first two holes can be 1/1000 part of ten inches. The distance between the next two adjacent holes can be 1/900 part of the plate length and so on. The result is a plurality of indexing systems of two holes each, wherein the distance between two predetermined holes represents a fractional part of the total plate length, or any frequently used length which normally would require a plurality of index plate motions.

If a conventional scribe is employed on a stationary base, say end section 16, and the work is mounted on the arm plate 22, a scribing on the work initially and at the finish of each net movement will produce a linear graduation of the work.

The 101-hole, 100-hole, and 99-hole indexing systems on the linear device actually have 102 holes, 101 holes, and 100 holes respectively since as was previously indicated, a starting or zero hole is used as a point of reference. The 101-hole system is designated for convenience instead of a 101-space indexing system.

*Angular dividing*

In the drawing, Figs. 3 and 4, reference number 50 designates a base member or stand upon which the apparatus is supported. Two upwardly extending members 51 and 52 terminate in bearings 53 and 54 which rotatably support sleeves 55 and 56 respectively. In the upper surfaces of the bearings, thumb screws 57 and 58 are provided with ball shaped ends 59 and 60 which engage peripheral grooves 61 and 62 in sleeves 55 and 56 respectively. By tightening the thumb screws, the sleeves may be locked in the bearings and rotation prevented.

Shafts 63 and 64 may be provided, one of which may be operatively connected to a work piece, not shown, wherein the angular dimensions or divisions may be accurately marked or otherwise located. The shaft so operatively connected should be securely locked to its associated sleeve. As an example, in Fig. 3, set screw 65 is shown locking sleeve 55 to shaft 63.

The two shafts may be accurately positioned axially by the cone and recess arrangement 66, which centers the two shafts, yet allows independent rotation of each.

Sleeve 55 is secured to an indexing plate 70, provided with a circumferential series of accurately and equally spaced holes 71, which are 101 in number. The holes are located adjacent to the edge of the wheel to provide the maximum separation between holes.

Adjacent to plate 70, and rotatably and independently mounted on shaft 63, is an intermediate plate 72 provided with a peripheral series of equally spaced holes 73 which are 100 in number. The plate has an ear 74 containing a hole 75 the center of which is axially aligned with the centers of holes 71 in plate 70.

Adjacent to plate 72 is the end plate 76, mounted in a similar manner to plate 72, containing a peripheral series of equally spaced holes 77 which are 99 in number, together with extending ear 78, with hole 79 contained therein so as to be axially aligned with holes 73 in plate 72.

Each plate is smaller in diameter than its adjacent plate, leaving the adjacent plate with its peripheral holes exposed to view except for the extending ear and aligning hole therein.

A secondary concentric series of variously spaced holes 80 are located on end plate 76, the purpose for which will be hereinafter explained. One of these holes extends through plates 72 and 70, forming holes 81 and 82 respectively.

An arm 83 extends radially from sleeve 56, to which it is integrally formed, and contains holes 84, 85, 86, and 87 opposite holes 80, 77, 73, and 71 respectively.

Locating pins 88, 88a, 89, 89a, 90, 91, and 91a are provided to position the various parts with respect to each other and to the arm as will be subsequently described. Spacer 92 is positioned between the arm 83 and the end plate 76 at the junction between shafts 63 and 64, to hold the end plate in position and to provide sufficient space therebetween when the pins are inserted into the plates without passing through the arm.

I can mathematically determine the exact movement of the three plates with respect to each other, to locate any point on a circle with respect to a point of reference. If it is assumed that for a particular calculation it is required to rotate the intermediate plate 72 twelve holes on the plate 70 in a clockwise direction and the end plate fourteen holes counterclockwise on the intermediate plate and the arm 83 sixteen holes clockwise on the end plate, the following procedure would be employed: Pin 91 would be removed, with pin 88 locking plate 72 to plate 70, pin 89 locking plate 76 to plate 72, and pin 90 locking arm 83 to plate 76. Thumb screw 57 would be tightened locking the plate 70 into immovable position. Thumb screw 58 is loosened to permit rotation of arm 83. Thereafter pin 88 is removed, and plate 72 rotated twelve holes clockwise with respect to the fixed plate 70 and the pin 88 reinserted into the twelfth hole on the plate 70. During this operation, plate 76 and arm 83 have been rotated with plate 72.

Thereafter pin 89 is removed and plate 76 is rotated counterclockwise fourteen holes with respect to fixed plate 70, and intermediate plate 72 secured to it by pin 88, carrying arm 83 with end plate 76. Pin 89 is then reinserted, locking the three plates together.

Finally, pin 90 is removed and arm 83 rotated clockwise sixteen holes on end plate 76, and reinserted therein. Thus the arm 83 has been moved twelve holes clockwise on the 101-hole system, fourteen holes counterclockwise on the 100-hole system, and sixteen holes clockwise on the 99-hole system, producing a net movement of twelve holes on the 101-hole system, plus sixteen holes on the 99-hole system, minus fourteen holes on the 100-hole system, or a net movement clockwise of 50°33′14.7″ without the use of a worm.

From the foregoing it is apparent that any movement of holes, clockwise or counterclockwise, may be carried out with respect to the three sets of indexing holes with a resultant angular net movement of arm 83 and plate 70 with respect to each other, locating the desired position on the circle.

Thus if a gear blank was attached to shaft 64, and shaft 64, locked to sleeve 56 by a set screw similar to set screw 65, the resultant movement of the gear would correspond to the net movement of arm 83, and the position on the gear blank 50°33′14.7″ from the starting position could be marked thereon.

By computing the proper movement of plates and arms, any angular position on a circle can be determined mechanically within one part in 3,999,600. By using a 40 pitch worm and screw between the shaft and the work in a manner known to the art as shown in Pat. No. 2,228,583, any position can be located on a circle within one part in 159,984,000.

If the gear blank is attached to shaft 63, and the sleeve 55 locked to the shaft by set screw 65, the angular position desired can be determined by locking arm 83 to the plates, employing pin 90, locking arm 83 into fixed position by tightening thumb screw 58, and loosening thumb screw 57 to permit the plate 70 and shaft 63 to rotate as a unit.

With pins 90 and 89 in position, pin 88 is removed and plate 70 moved in the desired direction and for the proper number of 101 holes. Thereafter pin 88 is reinserted, and pin 89 removed while plates 70 and 72 are rotated as a unit in the direction and for the proper number of 100 holes, whereupon pin 89 is reinserted. Thereafter pin 90 is withdrawn and reinserted after the plates are moved the proper direction and number of holes on the 99-hole system. The work attached to shaft 63 is thus moved a net angular distance resulting from the foregoing movements.

The pins 88 and 89 although extending through holes 75 and 79 in ears 74 and 78 respectively, may be started in any hole in their respective indexing systems which is designated as the starting point for movement, so that they need not be radially aligned as indicated in Figs. 3 and 4.

I have further discovered that my three plates may be locked to each other and moved as a unit to constitute a single plate member without shifting one indexing system with respect to one another, and still obtain the same net movement as if the plates were separately movable with respect to one another.

This can be accomplished by inserting a pin 91a through holes 80, 81 and 82, and not through the arm hole 84 with the head of pin 91a indicated by the dot-dash position in Fig. 3. Pin 88 is replaced by a pin 88a which is inserted through hole 87 on the arm and extends into holes 75 and 71 of plates 72 and 70. Pin 89 is similarly replaced by 89a indicated by dotted lines, and extends through holes 86, 79 and 73, of arm 83, end plate 76 and intermediate plate 72 respectively. The plates being thus locked by pin 91a, tightening thumb screw 57 will prevent the plates from movement, while tightening thumb screw 58 will lock the arm 83. The plates and arms are locked into position with pin 88a in position. The pins 88a, 89a, and 90 are then removed as arm 83 is allowed to move with respect to the holes on the 101 circle by loosening thumb screw 58. Pin 88a is then inserted into the proper hole on the 101 circle and the arm is locked by its thumb screw. The pin 88a is then removed, and the locked plates are permitted to rotate as a unit by loosening thumb screw 57, until one of the holes on the 100 circle is opposite hole 86, and pin 89a is inserted therein. The plates are then prevented from rotating by tightening thumb screw 57; thumb screw 58 is loosened, and pin 89a is withdrawn and arm 83 allowed to move in the proper direction until pin 89a can be inserted into the proper hole on the 100-hole system. Arm 83 is then locked, and the locked plates permitted to rotate with pin 89a withdrawn until one hole of the 99-hole system is opposite hole 85, so that pin 90 can be inserted therethrough. The locked plates are then prevented from rotating by tightening the thumb screw 57, and arm 83 is permitted to rotate in the proper direction and for the desired number of holes in the 99-hole system, with pin 90 withdrawn, and reinserted into the proper hole. The arm has by the foregoing been moved the net angular distance resulting from the calculations. Any work attached to the arm would be similarly moved.

If the work is attached to shaft 63 and secured to sleeve 55, by set screw 65, the proper movement for the work through a clockwise arc of 55°33′14.7″ would be as follows: The arm is locked to the plates by inserting pin 88a into a hole on the 101 hole circle and through hole 87 of the arm. The position locking means or thumb screw 58 is tightened to lock the arm in fixed position with respect to the base member 50. Pin 88a is then removed and the plates as a unit are moved clockwise 12 holes on the 101 hole circle, and the pin 88a is reinserted to position accurately the plates and attached work, with respect to the arm. Thumb screw 57 is then locked, pin 88a is removed, and thumb screw 58 is loosened. Pin 89a is then inserted into hole 86 of the arm through a hole of the 100 hole circle to establish a fixed point with respect thereto, thumb screw 58 is locked, to fix the arm. Pin 89a is then removed, and thumb screw 57 loosened. The plates are then moved counterclockwise 14 holes on the 100 circle, and the pin 89a inserted and thumb screw 57 locked. Pin 89a is removed, thumb screw 58 loosened, and pin 90 inserted into hole 85 of the arm, and into a hole on the 99 hole circle. Thumb screw 58 is locked, 57 loosened, pin 90 removed, and the plate and attached work moved clockwise 16 holes on the 99 hole circle, whereupon pin 90 is reinserted to position accurately the plate which has thus moved the work the desired distance.

An additional feature is provided in my device. Holes 80 in plate 76 are located with respect to each other so as to furnish a predetermined movement between any two holes which is different for different holes. The holes may be thus designed so that the distance between 80a and 80b will be 1/50 of a circle. The distance between 80b and 80c may be 1/51 of a circle, and so on.

By providing a fraction of the total circular movement, between predetermined holes on the same circle, I can by repeating each fraction, locate a succession of equal parts around the total circumference.

Thus with the plate 76 locked to plate 72, by pin 89, and plate 72 locked to plate 70 by pin 88, I can lock the plates and prevent rotation thereof, with all the holes 80 free of pins. The plates are then prevented from rotating by tightening thumb screw 57. Arm 83 is rotated until pin 91 inserted into hole 84 of the arm, fits into one of the selected holes 80 in plate 76. The arm is then locked to prevent rotation, pin 91 is removed and the plates are rotated as a unit until pin 91 can be inserted into the next selected hole on row 80. The net movement is the distance between the two selected holes. To repeat the same angular movement, the plates are prevented from rotation, pin 91 removed and the arm 83 rotated until the original selected hole is opposite hole 84 whereupon pin 91 is reinserted, and the arm locked. The plates are then rotated as indicated above and the angular distance is thus repeated. We have thus a plurality of indexing systems of two holes each, all centers circumferentially aligned. Each indexing increment can be repeated successively or changed as desired. A single circumferential series of holes can thus be used to establish a plurality of indexing systems, the limits being the number of holes that can be conveniently placed apart in any selected circumference. The series can be continued by providing an additional circumferential series of holes in another row with a corresponding hole in arm 83 for locating each series.

The pins and holes may be cone-shaped to provide a centering of the two for extremely accurate positioning. This is not shown since it is an established practice in the prior art. Similarly spring type pins may be used which will locate themselves in the holes under spring pressure. Notches, or other types of indicia may be employed. These are shown in Pat. No. 2,144,972.

In both the linear and angular indexing devices, I have used 101-hole, 100-hole and 99-hole systems for my indexing plates to facilitate the mathematical computations necessary to determine the respective movements of the indexing systems with respect to each other and to the index locating means or arms, whereby the resultant net movement will provide the final linear or angular measurement sought. The mathematical computations are facilitated because the fractional parts of each indexing system selected contains repeating digit series, namely: $1/101$ equals .00990099, $3/101$ equals .02970297, $1/99$ equals .01010101, $37/99$ equals .37373737, etc.

Any system of indexing holes can be used that gives the satisfactory accuracy in the results obtained. Further limitations are the length of the linear device, and the diameter of the angular plates, the distance between holes, the size of the holes, etc., the position locking means 33 and 18 of Fig. 1, and 57 and 58 of Fig. 3, are capable of locking the arm 22, and plate 10, the arm 83, and plate 70 respectively, in any one of an unlimited number of positions with respect to their frames.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

What I claim and desire to secure by Letters Patent is as follows:

1. An indexing device for moving a work piece a predetermined distance, comprising a supporting base providing a fixed reference frame, a plate member mounted on said base and movable with respect to said base in a predetermined plane, said plate member containing a plurality of indexing systems fixedly positioned thereon, each indexing system containing a plurality of indicia positions, the distance between two selected indicia in any system being different from the distance between any two indicia in any other indexing system, an arm member mounted on the base and movable only in a plane parallel to the predetermined plane of the plate member, the work piece being fixedly secured to one of said members and movable therewith, said arm member having a reference indicium and locating means associated therewith for engaging an indicium on an indexing system; said arm and plate members provided with position-locking means for independently fixing the position of the arm member and the plate member in any position with respect to the fixed reference frame, said plate and arm members being alternately unlockable and movable from their fixed position with respect to the fixed reference frame a distance equal to the distance between two selected indicia in any system, and continued alternate movement of said members moving the work piece the predetermined distance.

2. The indexing device of claim 1 wherein the plate member and the arm member are rotatably mounted on the same axis, and the indexing systems are circumferentially positioned on the plate member.

3. The indexing device of claim 1, wherein the plate member and the arm member are linearly movable in a track on the base.

4. The indexing device of claim 1 wherein the indexing systems consist of 99, 100, and 101 equally spaced divisions respectively.

5. The indexing device of claim 1 wherein each of the indexing systems is comprised of two indicia only.

6. The indexing device of claim 1 wherein each of the indexing systems has an indicium common to at least two indexing systems.

SIDNEY STEVEN BRODIE.

REFERENCES CITED

The following references are of record in the file of this patent:

UNITED STATES PATENTS

| Number | Name | Date |
|---|---|---|
| 344,676 | Ourdan | June 29, 1886 |
| 612,412 | Grohmann | Oct. 18, 1898 |
| 918,065 | Law | Apr. 13, 1909 |
| 1,864,341 | Davie | June 21, 1932 |
| 2,144,972 | Hirst | Jan. 24, 1939 |